(12) United States Patent
Durham et al.

(10) Patent No.: US 11,865,905 B2
(45) Date of Patent: Jan. 9, 2024

(54) MULTI-PANEL REMOVABLE ROOF

(71) Applicant: Continental Structural Plastics, Inc., Auburn Hills, MI (US)

(72) Inventors: Patrick Durham, Auburn Hills, MI (US); Yuhei Konagai, Auburn Hills, MI (US); Yagi Yutaka, Auburn Hills, MI (US); Matthew Plauman, Auburn Hills, MI (US); Evan Freeman-Gibb, Auburn Hills, MI (US); Hugh Foran, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 284 days.

(21) Appl. No.: 17/420,160

(22) PCT Filed: Jan. 6, 2020

(86) PCT No.: PCT/US2020/012350
§ 371 (c)(1),
(2) Date: Jul. 1, 2021

(87) PCT Pub. No.: WO2020/142765
PCT Pub. Date: Jul. 9, 2020

(65) Prior Publication Data
US 2022/0063384 A1    Mar. 3, 2022

Related U.S. Application Data

(60) Provisional application No. 62/788,208, filed on Jan. 4, 2019.

(51) Int. Cl.
*B60J 7/11*    (2006.01)

(52) U.S. Cl.
CPC ...................................... *B60J 7/11* (2013.01)

(58) Field of Classification Search
CPC .......................................................... B60J 7/11
(Continued)

(56) References Cited

U.S. PATENT DOCUMENTS

| 4,330,150 A | 5/1982 | Duchock et al. |
| 4,513,196 A | 4/1985 | Bartelsen et al. |

(Continued)

FOREIGN PATENT DOCUMENTS

| CA | 2234302 C | * 2/2008 | ............ B60J 7/1614 |
| CN | 201566457 U | 9/2010 | |

(Continued)

OTHER PUBLICATIONS

Supplemental EP Search Report issued in EP20735866, dated Aug. 11, 2022.
Int'l Search Report for PCT/US2020/012350, dated May 1, 2020.

*Primary Examiner* — Dennis H Pedder
(74) *Attorney, Agent, or Firm* — MaxGoLaw PLLC

(57) ABSTRACT

A vehicle removable roof system including a roof support structure removably attachable to a vehicle, the roof support structure including a plurality of vertically oriented supports and at least one horizontally oriented support. The at least one removable panel configured to engage with the roof support structure. The vehicle removable roof system formed of a light weight sandwich composite structure that affords a high gloss surface without resort to additional processing after production with improved moisture resistance and edges suitable for sealing the removable roof assembly to other vehicle components.

20 Claims, 17 Drawing Sheets

(58) Field of Classification Search
USPC .................................................. 296/218, 102
See application file for complete search history.

(56) References Cited

U.S. PATENT DOCUMENTS

| | | | |
|---|---|---|---|
| 4,746,163 A | 5/1988 | Muscat | |
| 4,803,108 A | 2/1989 | Leuchten et al. | |
| 6,761,953 B2 | 7/2004 | Haas et al. | |
| 6,857,684 B2* | 2/2005 | Worley | B60J 10/248 |
| | | | 296/108 |
| 8,991,896 B1* | 3/2015 | Whitehead | B60J 7/196 |
| | | | 296/121 |
| 9,180,762 B2* | 11/2015 | Jeakle | B60J 7/11 |
| 9,643,823 B2* | 5/2017 | Hall | B66C 23/48 |
| 2014/0368001 A1 | 12/2014 | Jeakle et al. | |
| 2018/0050580 A1* | 2/2018 | Sviberg | B32B 5/18 |
| 2019/0283361 A1* | 9/2019 | Du | B32B 27/34 |

FOREIGN PATENT DOCUMENTS

| | | | | |
|---|---|---|---|---|
| DE | 102007039126 A1 | 2/2009 | | |
| EP | 0288843 A2 | 11/1988 | | |
| EP | 1524175 A2 | 4/2005 | | |
| JP | 2007107182 A | * | 4/2007 | F24J 2/045 |
| KR | 1019980029168 A | 7/1998 | | |

* cited by examiner

MULTI-PANEL REMOVABLE ROOF

CROSS REFERENCE TO RELATED APPLICATIONS

This application claims priority to U.S. Provisional Application No. 62/788,208 filed Jan. 4, 2019, the contents of which is incorporated herein by reference as if explicitly and fully expressed herein.

FIELD OF THE INVENTION

The present invention in general relates to a vehicle roof assembly and, more particularly, to a multi-panel removable vehicle roof formed of a composite sandwich structure assembly with an intervening open area core support matrix and surface sheets adhered to the open area core to provide at least one surface that meets vehicle exterior surface gloss standards.

BACKGROUND OF THE INVENTION

Vehicles with removable roof assemblies, especially for sport utility vehicles (SUV) and jeeps have become increasingly popular. Such vehicles allow users to remove the roof from the body of the vehicle for an open-air driving experience when desired and attach the roof to the body of the vehicle when a standard enclosed, protected from the elements driving experience is necessary or desired. Typically, removable roof assemblies are formed of aluminum, steel, or carbon fiber. These materials and the general geometries of typical removable roof assemblies result in heavy, bulky parts that tend to make removal of such roof assemblies difficult, often requiring multiple people to assist in the removal process and limiting the situations in which the roof assemblies may be removed from the vehicle body.

In an effort to reduce overall vehicle weight in order to make more fuel-efficient vehicles and to reduce the weight of removable roof assemblies in order to make roof removal easier, glass reinforced plastics and composites, including sheet molding compounds (SMC) or bulk molding compounds (BMC) have been introduced to take the place of metal structural and surface body components and panels. A sandwich-structured composite is a special class of composite material that is fabricated by attaching two thin but stiff skins to a lightweight but thick core. The core material is normally a low strength material, but its higher thickness provides the sandwich composite with high bending stiffness with overall low density.

While sandwich structures have previously been developed to provide strength and reduced weight, the ability to obtain a vehicle exterior quality high gloss surface has remained a challenge, regardless of whether the surface outermost layer is thermoset resin or thermoplastic, thereby making such composites unsuitable for removable roof assemblies. Exemplary of these efforts are U.S. Pat. Nos. 5,087,500A; 4,803,108A; 8,091,286B2; 4,369,608A; 3,553,054A; and WO2018/202473. It is conventional to either not use such structures in settings where vehicle high surface gloss is required, or resort to an additional outer layer to provide a high gloss outermost layer. Such outermost layers can be applied after structure production or through in mold coatings, both of which add to the cost and complexity of production.

Still another problem conventional to the art is that structure edges are ineffective and allow for infiltration of humidity or moisture that becomes entrained within the core. With temperature extremes experienced by roof assemblies, this entrained moisture can reduce the operational lifetime of the structure, while increasing the weight thereof. These problems of moisture infiltration are particularly pronounced in instances when the core is formed of cellulosic materials such as paper. Furthermore, the edges of conventional sandwich structure composites are often inconsistent with finished vehicle surface requirements, particularly the edge requirements of removable roof assemblies, which require weather-stripping and a water management system ensuring the vehicle interior and any occupants remain dry from rain and snow.

Thus, there exists a need for an improved removable roof structure formed of a sandwich composite structure that affords a high gloss surface without resort to additional processing after production with improved moisture resistance and edges suitable for sealing the removable roof assembly to other vehicle components.

SUMMARY

An inventive vehicle removable roof system is provided. The inventive vehicle removable roof system includes a roof support structure and at least one removable panel that engages with the roof support structure. According to embodiments a gasket is included to seal the engagement between the support structure and the removable panel. The roof support structure includes a plurality of vertically oriented supports and a horizontally oriented support. The at least one removable panel is formed of a composite sandwich panel assembly. The roof support structure and the at least one removeable panel each have a flange extending therefrom. The panel flange that extends from the removable panel is configured to engage with the support structure flange that extends from the roof support structure. The sealing gasket is positioned between the support structure flange and the panel flange to seal the removable panel and the roof support structure and prevent water from entering the interior of the vehicle when the removable panel is engaged with the roof support structure. The removable panel may be removed from the removable roof assembly with ease while the roof support structure remains in place and attached to the vehicle body. Alternatively, both the removable panel and the roof support structure may be removed from the vehicle with ease. Accordingly, the inventive vehicle removable roof system allows for increased variability and ease of use compared to prior art removable roof systems. According to embodiments the composite sandwich panel assembly is formed of an open area core defining a plurality of pores, a high gloss surface sheet adhered to a first face of the open area core by a first adhesive layer, and a structural skin adhered to a second side of the open area core by a second adhesive layer. The inventive vehicle removable roof structure is thus formed of a light weight sandwich composite structure that affords a high gloss surface without resort to additional processing after production with improved moisture resistance and edges suitable for sealing the removable roof assembly to other vehicle components.

BRIEF DESCRIPTION OF THE DRAWINGS

The present invention is further detailed with respect to the following drawings that are intended to show certain aspects of the present invention, but should not be construed as a limit on the practice of the present invention.

DESCRIPTION OF THE INVENTION

Figure 1:
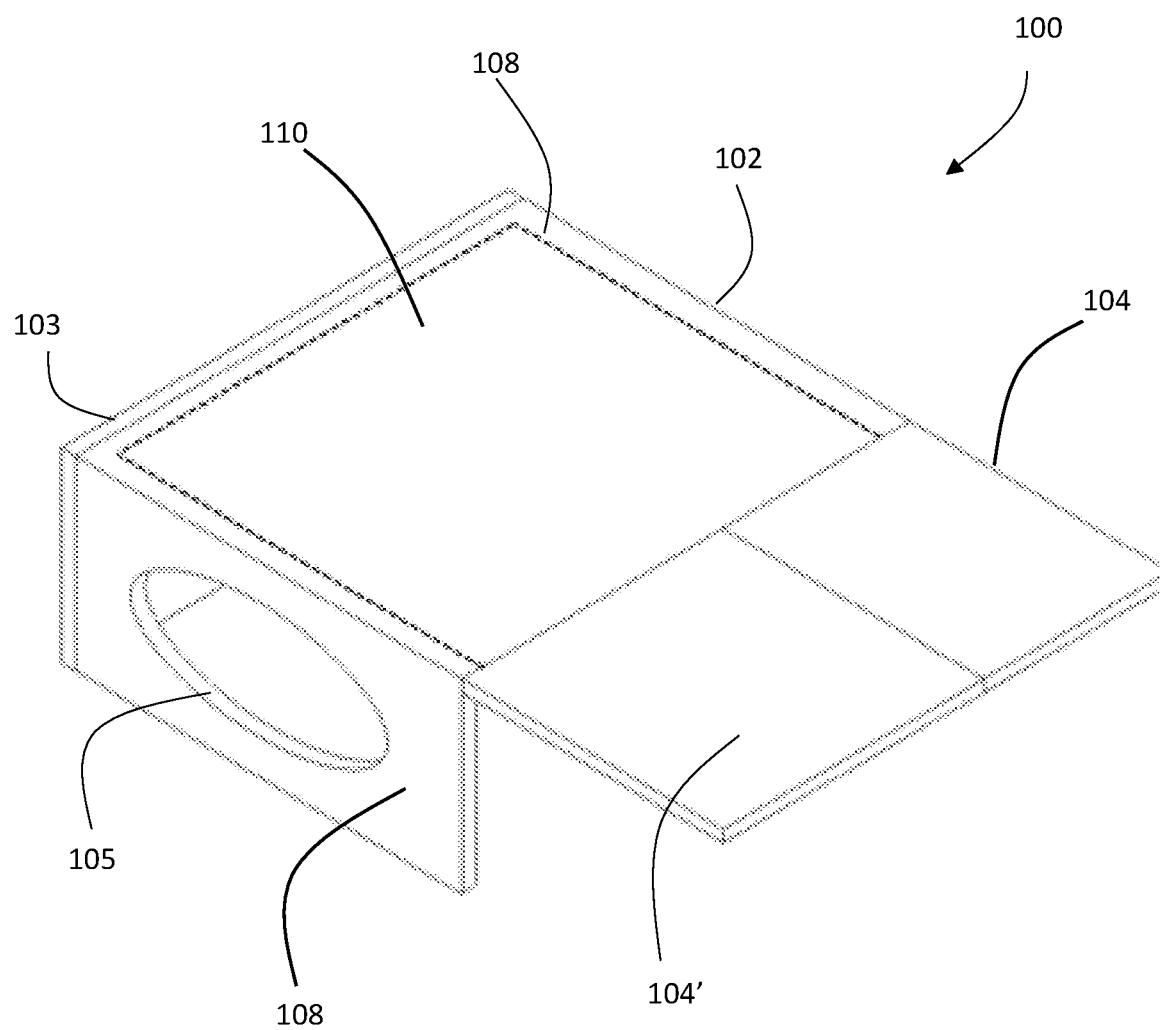
FIG. 1 is a front perspective view showing a vehicle removable roof system according to embodiments of the present disclosure.
Figure 2:
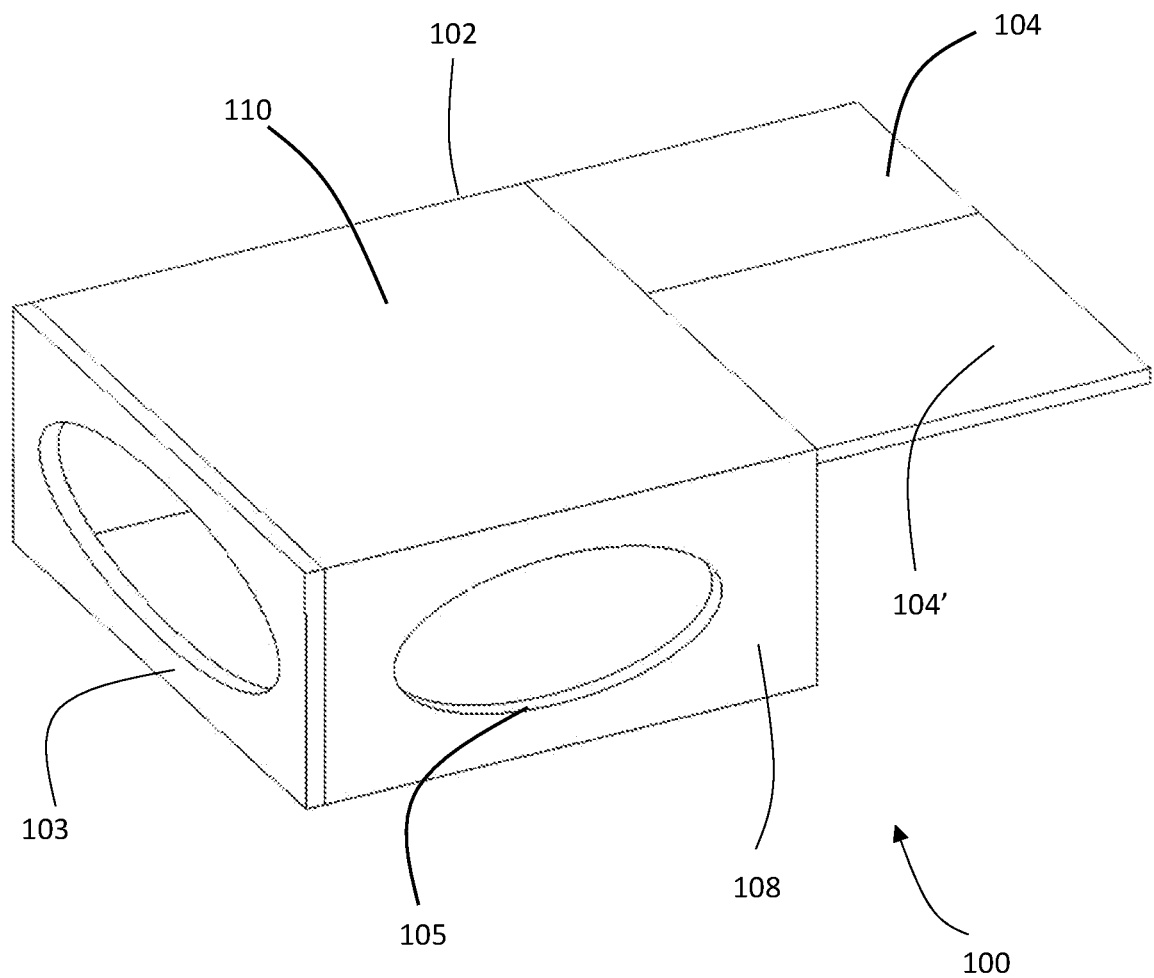
FIG. 2 is a rear perspective view showing a vehicle removable roof system according to embodiments of the present disclosure.
Figure 3:
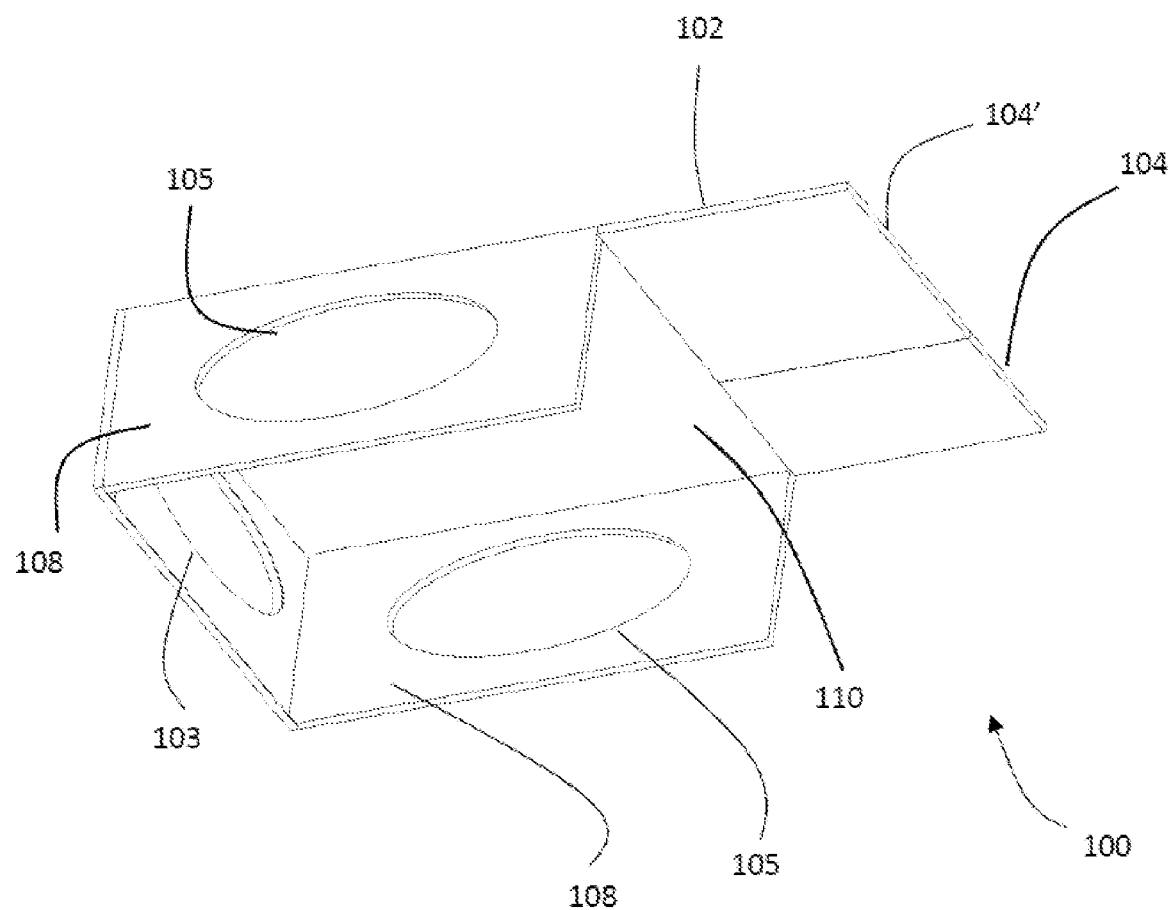
FIG. 3 bottom perspective view of a rendering showing the bottom/inside of a vehicle removable roof system according to embodiments of the present disclosure.

The present invention has utility as an improved vehicle removable roof structure formed of a light weight sandwich composite structure that affords a high gloss surface without resort to additional processing after production with improved moisture resistance and edges suitable for sealing the removable roof assembly to other vehicle components. According to embodiments, the inventive vehicle removable roof system includes a roof support structure, at least one removable panel that engages with the roof support structure, and a gasket to seal the engagement between the support structure and the removable panel. The roof support structure includes a plurality of vertically oriented supports and at least one horizontally oriented support. According to embodiments, the roof support structure formed at least in part of the vehicle structure such as the roll bars of the vehicle, or the roof support structure is configured to be removably attached to the vehicle body. The at least one removable panel is formed of a composite sandwich panel assembly. According to embodiments, the roof support structure and the at least one removeable panel each have a flange extending therefrom. The panel flange that extends from the removable panel is configured to engage with the support structure flange that extends from the roof support structure. A sealing gasket may be positioned between the support structure flange and the panel flange to seal the removable panel and the roof support structure and prevent water from entering the interior of the vehicle when the removable panel is engaged with the roof support structure. The removable panel may be removed from the removable roof assembly with ease while the roof support structure remains in place and attached to the vehicle body. Alternatively, both the removable panel and the roof support structure may be removed from the vehicle with ease. Accordingly, the inventive vehicle removable roof system allows for increased variability and ease of use compared to prior art removable roof systems.

According to embodiments the composite sandwich panel assembly forming the removable panel and other components of the inventive vehicle removable roof system comprises an open area core defining a plurality of pores, a high gloss surface sheet adhered to a first face of said open area core by a first adhesive layer, and a structural skin adhered to a second side of said open area core by a second adhesive layer. Further details regarding the composite sandwich panel assembly forming components of the inventive vehicle removable roof system are explained in U.S. Pat. No. 11,628,650, which is hereby incorporated by reference. Notable features of the composite sandwich panel assembly forming components of the inventive vehicle removable roof system include reduced delamination of the components of the inventive sandwich composite structure and reduced bond line readthrough into the high gloss surface sheet both due at least in part to the viscosity of the adhesive as applied creating greater adhered contact area between the components of the inventive sandwich composite structure. Additionally, the composite sandwich panel assembly provides a high gloss exterior surface without resort to an additional processing and watertight edges to prevent infiltration of humidity or moisture that can reduce the operational lifetime of the structure, particularly with temperature extremes experienced by roof assemblies.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, the term "high gloss surface" refers to a surface having minimal perceptible surface defects when visually inspected for about three seconds from about 24-28 inches from the viewer and normal to the part surface +/−90 degrees in a well-lit area. That is, the term "high gloss surface" refers to a surface capable of being painted and accepted as a "Class A" autobody part. This is commonly measured by ASTM D523. In the automotive industry, a Class A surface is a surface a consumer can see without functioning the vehicle (e.g., opening the hood or decklid), while a Class A surface finish generally refers to painted outer panels and specifically to the distinctness of image (DOI) and gloss level on the part. It is appreciated that a surface layer may be subjected to sanding, trimming, and priming prior to receiving a paint coating that imparts high gloss yet must retain dimensionality and adhesion uniformity to primer and paint so as to achieve a high gloss finish.

Referring now to the figures, an inventive vehicle removable roof system is shown generally at 100. The inventive vehicle removable roof system 100 comprises a roof support structure 102 and at least one removable panel 104. According to embodiments, a vehicle removable roof system 100 additionally includes a sealing gasket 106. The roof support structure 102 comprises a plurality of vertically oriented supports 108 and at least one horizontally oriented support 110. According to embodiments, the at least one horizontally oriented support 110 is a roof panel or at least one structural components of the vehicle such as a roll bar 113. According to various embodiments, the roof support structure further comprises a lift gate 103 and/or windows 105, which may be formed in the vertically oriented supports 108 or may be provided as separate removable panels that are configured to engage with the vehicle and the roof support structure. The at least one removable panel is configured to engage with the roof support structure.

Figure 6:
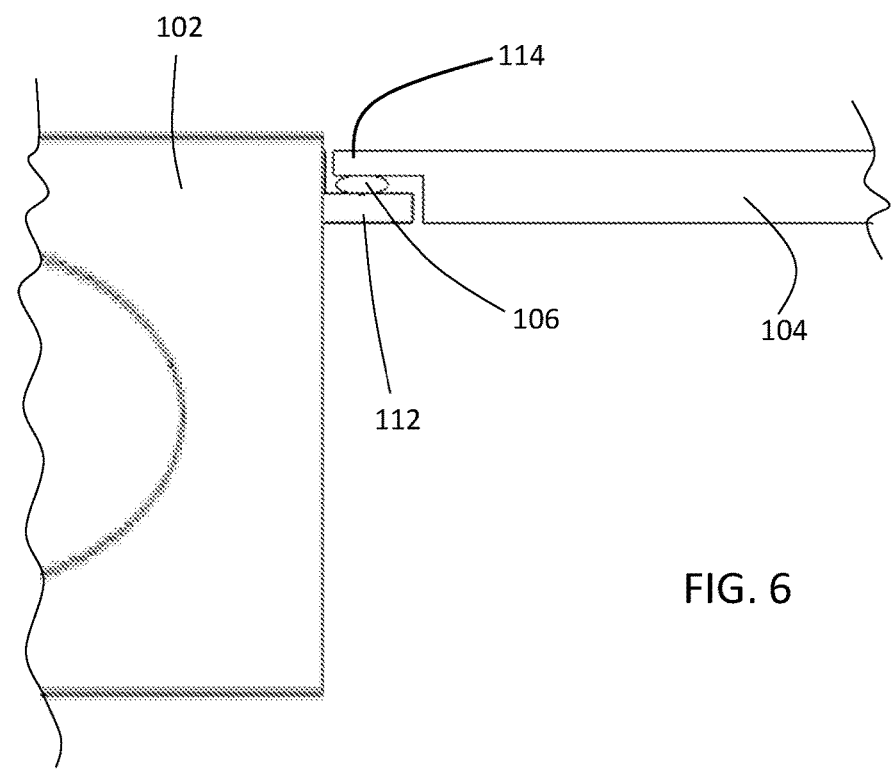
FIG. 6 is a side detail view of vehicle removable roof system of FIG. 5 showing a seal between a roof support structure and a removable panel of the vehicle removable roof system.
Figure 7:
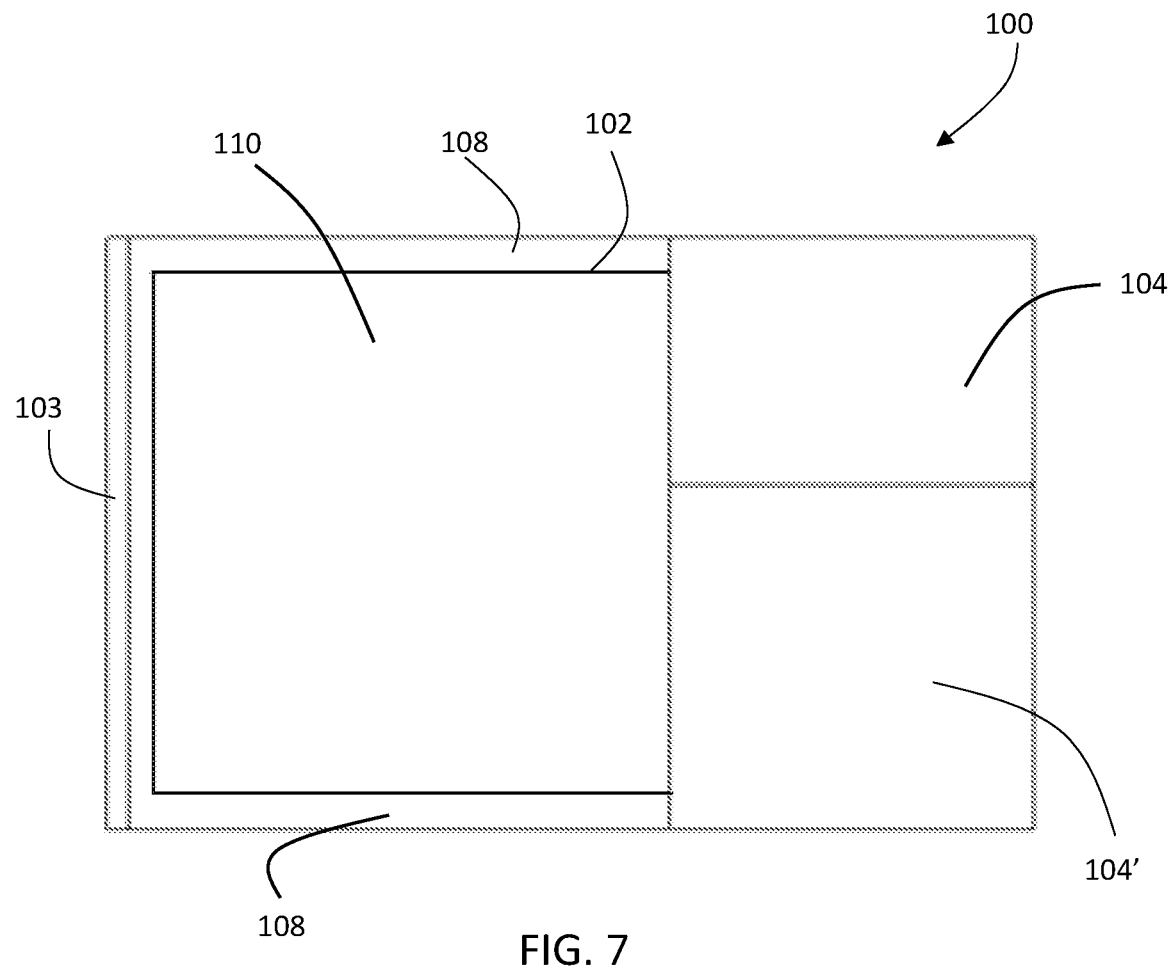
FIG. 7 is a top view showing a vehicle removable roof system according to embodiments of the present disclosure.
Figure 8:
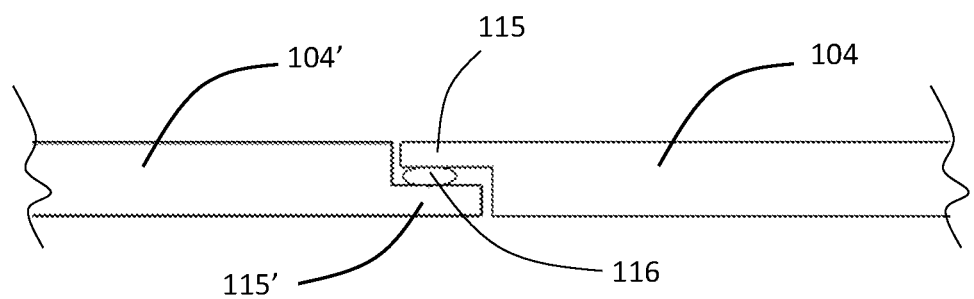
FIG. 8 is a front detail view showing a seal between portions of a removable panel of the vehicle removable roof system.
Figure 17A:
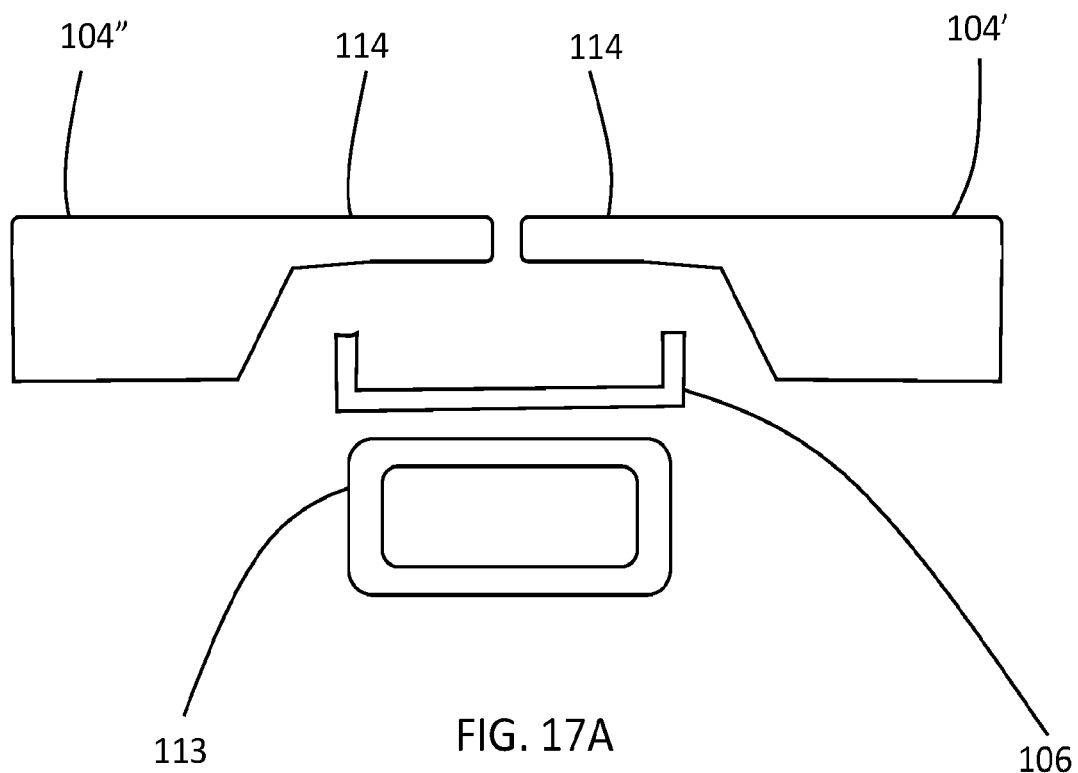
FIGS. 17A and 17B are detailed cross sectional views of the vehicle removable roof system of FIG. 16.
Figure 17B:
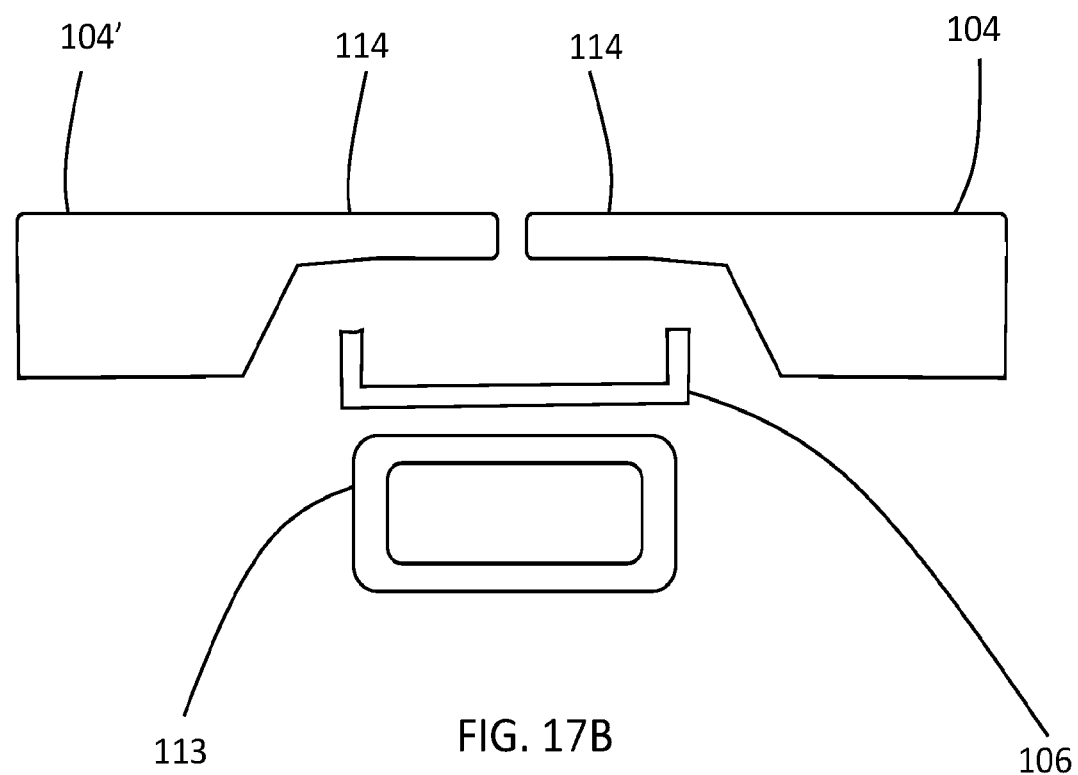
Figure 19A:
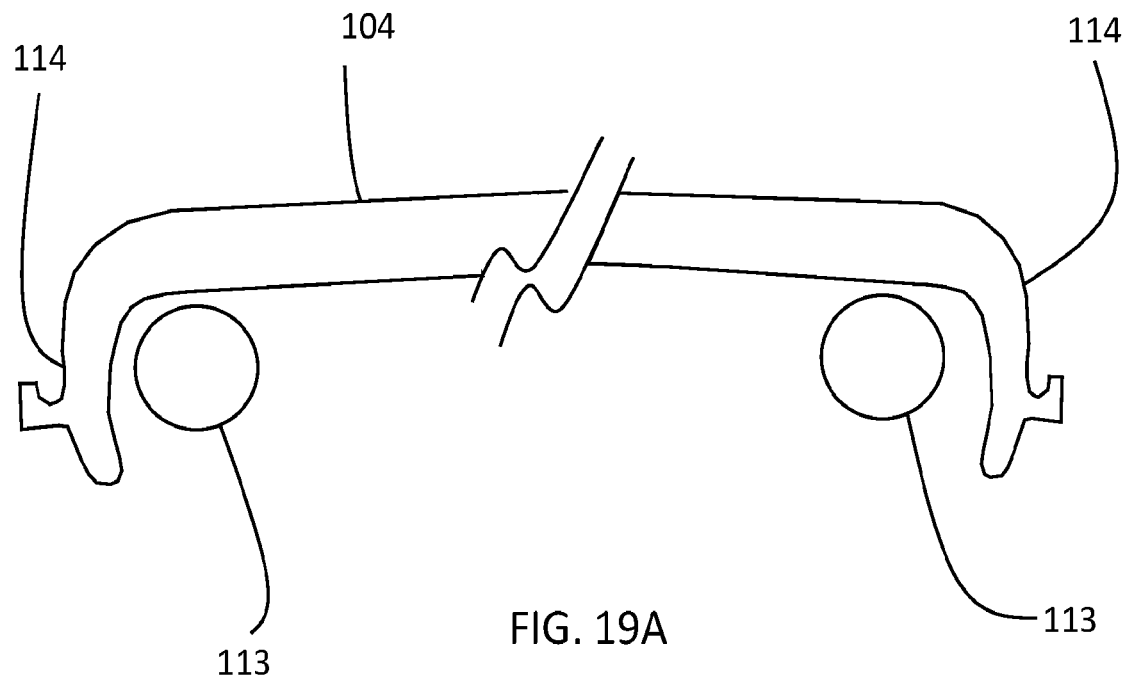
FIGS. 19A and 19B are detailed cross sectional views of the vehicle removable roof system of FIG. 18.
Figure 19B:
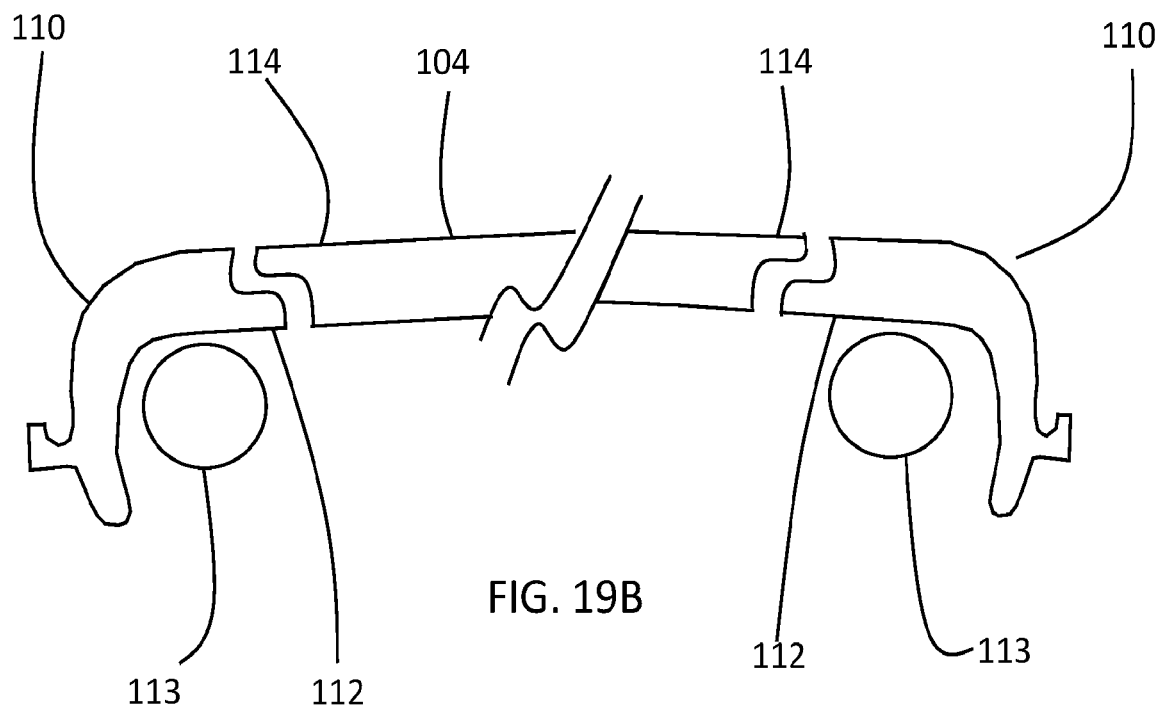

According to embodiments, the at least one removable panel is configured to engage with the roof support structure by the interaction of a support structure flange 112 that extends from the roof support structure 102 and a panel flange 114 that extends from the at least one removable roof panel, as shown in FIGS. 6 and 19B. The roof support structure 102 is removably attachable to the body of a vehicle. The at least one removable panel 104, 104' has a panel flange 114 extending therefrom that is configured to engage with the support structure flange 112 of the roof support structure 102. The sealing gasket 106 is positioned between the support structure flange 112 and the panel flange 114 to seal the sections of the roof structure and prevent water from entering the interior of the vehicle when the removable panel is engaged with the roof support structure. According to further embodiments, the at least one removable panel 104 is configured to engage with the roof support structure by the interaction of a panel flange 114' with a horizontally oriented support, such as a roll bar 113 of a vehicle, as shown in FIGS. 17A and 17B.

Figure 10:
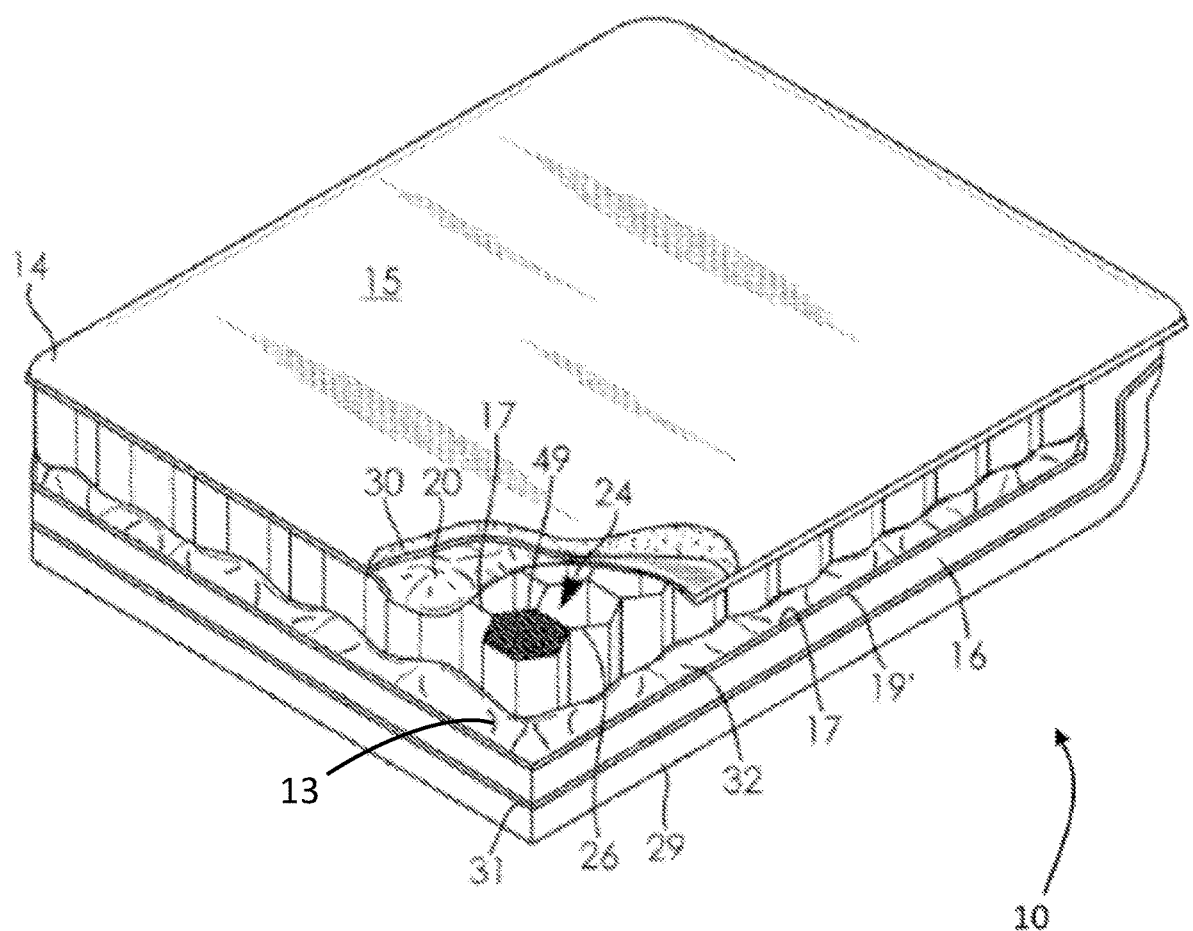
FIG. 10 is a partial cutaway, perspective view of composite sandwich assembly used to form components of a vehicle removable roof system according to embodiments of the present disclosure.
Figure 11:
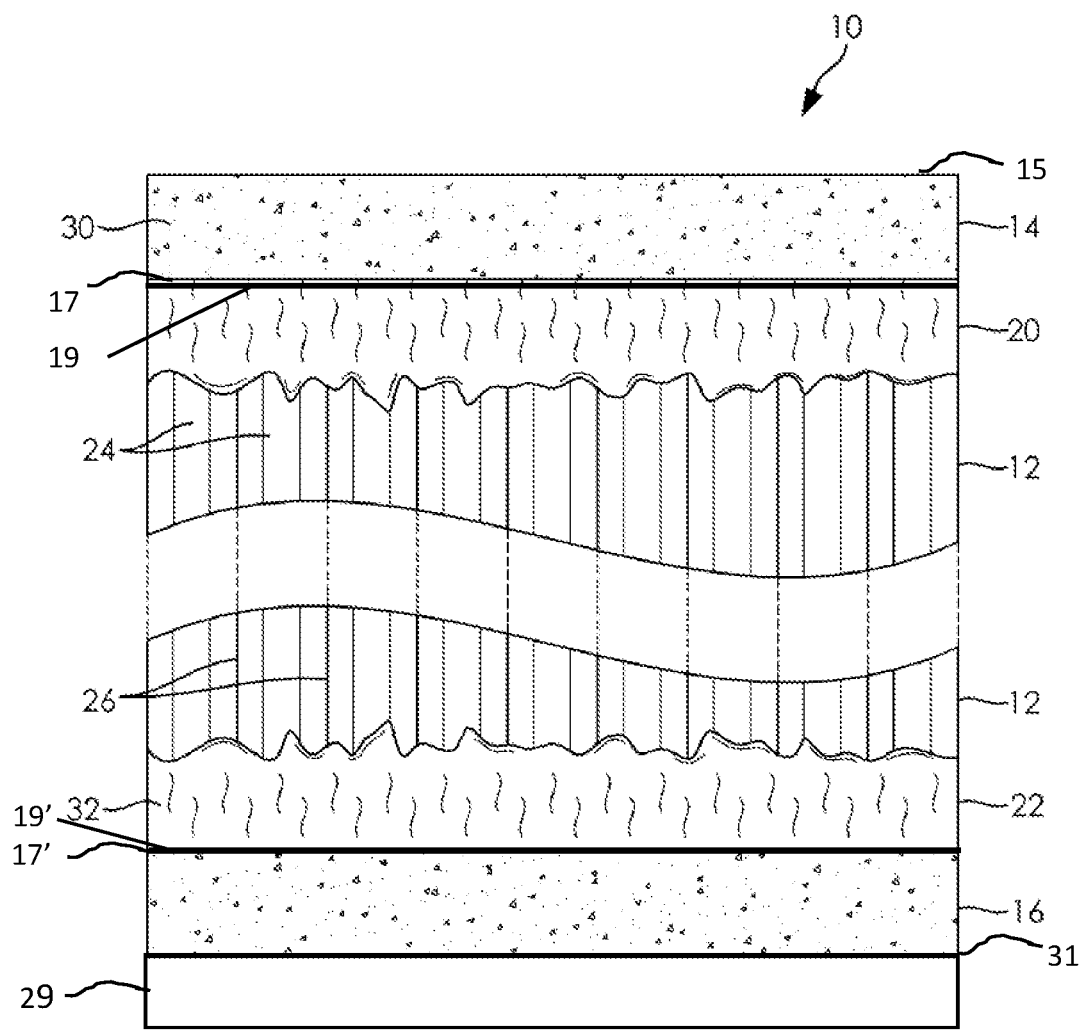
FIG. 11 is an enlarged partial cutaway, side view of a composite sandwich assembly of FIG. 10 along a line bisecting the hexagonal pores.
Figure 12A:
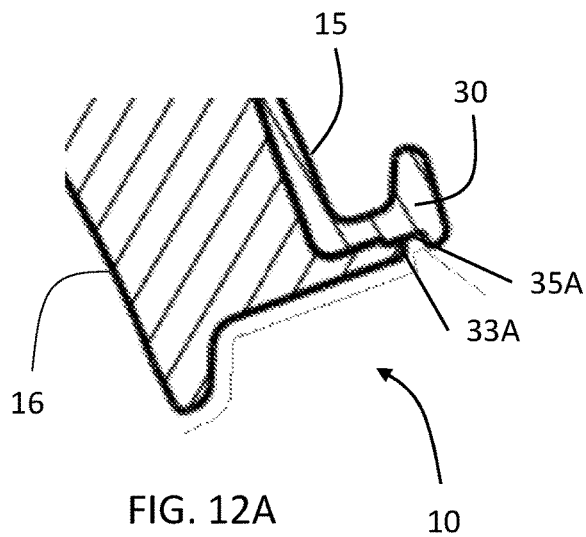
FIGS. 12A-12D are cross-sectional views of edges of a composite sandwich assembly of FIG. 11.
Figure 12B:
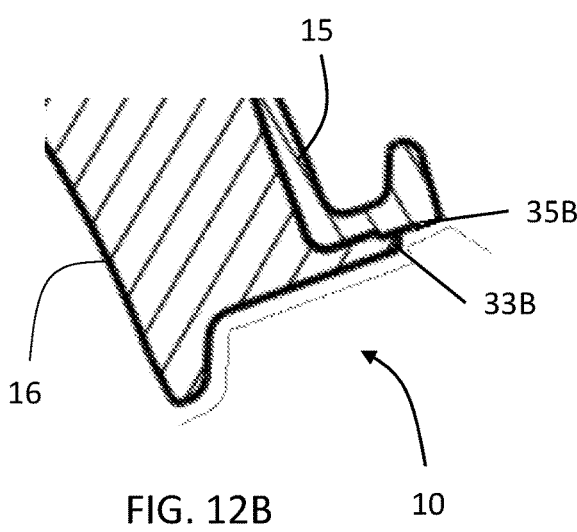
Figure 12C:
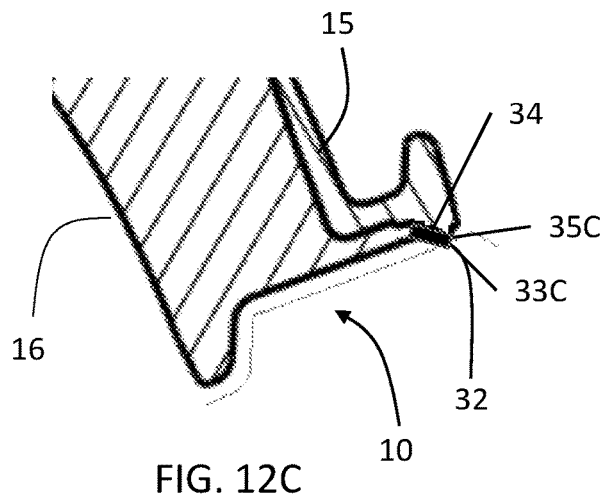
Figure 12D:
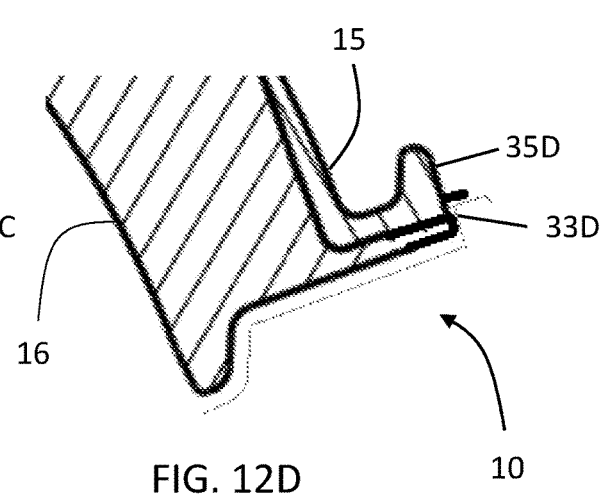

The at least one removable panel 104, 104' is formed of a composite sandwich panel assembly, shown generally at 10. As will be understood from the description herein, the composite sandwich panel assembly 10 is a light weight, high strength part with a high gloss surface suitable for exterior automotive finishes. The composite sandwich panel assembly 10 provides reduced delamination of the components and reduced bond line readthrough into the high gloss surface sheet. Additionally, the composite sandwich panel assembly 10 provides watertight edges to prevent infiltration of humidity or moisture that can reduce the operational lifetime of the structure, particularly with temperature extremes experienced by roof assemblies. According to embodiments, the sandwich 10 has an open area core 12 with walls 26 defining an ordered array of pores 24 terminating in faces 17 and 17'. The open area core 12 is positioned between a high gloss surface sheet 14 on one side and a structural skin 16 on an opposite side therefrom. As shown in FIG. 10, a portion of the high gloss surface sheet 14 is cutaway to reveal the adhesive 20, a cloth, if present; and the open area core 12. The high gloss surface sheet 14 is adhered to a first side of the open area core 12 by a first adhesive layer 20 and presents an outwardly facing high gloss surface 15. FIG. 11 is an enlarged cross-sectional view of a composite sandwich 10 suitable for forming components of the vehicle removable roof system 100 according to embodiments of the invention showing further details of the various layers making up the composite sandwich. In some cases, a cloth 19 is present intermediate between the face 17 of the open area core 12 and the high gloss surface sheet 14, the cloth 19 embedded within the adhesive 20. The structural skin 16 is adhered to an opposing second side of the open area core 12 by a second adhesive layer 22. In some cases, a cloth 19' is present intermediate between the face 17' of open area core 12 and the structural skin 16, the cloth 19' embedded within the adhesive 22. While the structure 10 depicted in FIGS. 10 and 11 is planar, it is appreciated that both the high gloss surface and the structure surface are each independently formed with non-planar contours.

The open area core 12 is formed of a lightweight material that defines a plurality of pores 24 so as to reduce the overall density of the open area core 12. The pores 24 are in shapes that illustratively include hexagonal, circular, rhomboidal, triangular, parallelogram quadrilateral, and regular quadrilateral. The faces 17 and 17' of the open area core 12 support the tensioned high gloss surface sheet 14 and structural skin 16 when the composite sandwich 10 is assembled and transfer externally applied forces within the structure 10. The open area core 12 is formed from a variety of materials that include cellulosics such as corrugated fiberboard, paper board, paper stock; thermoplastics such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; thermosets such as polyesters, polyureas, polyurethanes, polyurea/polyurethanes, epoxies, vinyl esters; metal such as aluminum, magnesium, and alloys of any one of the aforementioned where at least one of the aforementioned metals constitutes the majority by weight of the alloy; a foam formed from polyurethane, polyethylene, ethylene vinyl acetate, polypropylene, polystyrene, polyvinyl chloride, oraerogels, regardless of whether the foam is open-celled or closed-celled.

The pores 24 defined by walls 26 of the open area core 12 extend between faces 17 and 17'. In some embodiments, the walls 26 are treated to modify a property thereof such as hydrophobicity or surface energy to promote adhesion thereto. By way of example, cellulosics are prone to moisture uptake and are readily coated with a wax such as a paraffin, or a silicone to render the cellulosic more hydrophobic compared to a native state. Alternatively, the cellulosic is readily alkylated by conventional reactions such as those with chloroacetic acid. Sarymsakov, A. A et al., Chem. Nat. Compd. (1997) 33: 337. Metals are similarly coated with a primer or other corrosion inhibitor. Alternatively, metals or polymers are plasma treated to modify surface energies to facilitate adhesion thereto.

In certain inventive embodiments, the ratio of the thickness of a wall 26 to the maximal linear extent between faces 17 and 17' is between 0.01-10:1. A wall thickness ranges from 0.1 mm to 100 mm in such inventive embodiments.

The high gloss surface sheet 14 of the composite sandwich panel 10 forming the removable panel is formed from sheet molding compound (SMC), thermoplastic, dicyclopentadiene (DCPD), overmolded polyurethane (PU), or a combination thereof. According to embodiments, the high gloss surface sheet 14 includes a filler material 30 to reinforce and/or serve to decrease the weight of the high gloss surface sheet 14. The filler material 30 is any of glass fibers, carbon fibers, natural fibers, hollow or solid glass microspheres, or a combination thereof. The fibers may be oriented or non-oriented. In some inventive embodiments in which SMC forms the high gloss surface, a resin package sold by Continental Structural Plastics, Inc. under the tradenames TCA® and TCA® ULTRA-LITE™ are used herein. Exemplary formulations of which are detailed in U.S. Pat. No. 7,700,670; WO2017/184761; and U.S. Pat. No. 7,524,547B2. It is appreciated that the high gloss sheet routinely includes additives to retain dimensionality. Such additives routinely including glass fiber; carbon fiber; inorganic particulate fillers such as calcium carbonate, talc, and carbon black; glass microspheres; carbon nanotubes; graphene; low profile additives; moisture scavengers; and combinations thereof. Typical thicknesses of the high gloss surface sheet in the present invention range from 0.5 to 3.5 millimeters (mm) without regard to edges.

The high gloss surface sheet 14 is adhered to a first side of the open area core 12 by a first adhesive layer 20. The first adhesive layer 20 is formed of either a thermoplastic or curable formulation. According to certain inventive embodiments, the first adhesive layer 20 is a polyurethane or polyurethane prepolymer adhesive, which may be in the form of glue, a moisture cure adhesive, a reactive hot melt adhesive, or a polyurethane resin. As best shown in FIG. 11, due to the compressive force applied to the first adhesive layer 20 between the high gloss surface sheet 14 and the open area core 12, the adhesive 20 is engineered to have an initial viscosity on contact with the face 17 and the walls 26 so as partially fill the pores 24 of the open area core 12. It is appreciated that the viscosity upon application is a function of factors that include application temperature, pore dimensions at the face, and intrinsic adhesive viscosity. The viscosity of the first adhesive layer 20 ensures that the adhesive does not excessively run into the pores defined in the open area core before the adhesive attains final strength. Accordingly, the adhesive surface area for adhesion between a high gloss surface sheet and an open area core is at least 5% more than surface area of the walls at the face. In still other embodiments, the adhesive area is between 5 and 100 surface area percent of the face, and even 100 surface area percent in still other inventive embodiments. This increased surface area of adhesion reduces delamination of the components of the inventive composite sandwich 10 and surprisingly allows for the use of thinner high gloss surface sheets that do not exhibit bond line read through. As a result of increasing the adhesive surface area coverage from 10 to 50 surface area percent allows for the comparatively expensive high gloss surface sheet to be reduced in thickness from 1.5 mm to between 1.3 and 0.8 mm while still retaining high gloss through prevention of bond line read through.

In some embodiments, a cloth 19 is embedded in the first adhesive layer 20. The cloth can be woven or nonwoven yet having sufficient porosity to allow the adhesive layer 20 to penetrate therethrough. The cloth 19 provides a larger surface area for adhesive layer 20 and mitigates surface tension differences relative to structural layer 16 associated with situations such as the manufacturing process, temperature differences in a use environment, and differential force loading during usage. A cloth 19 operative herein illustratively includes fibers of thermoplastic materials such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; carbon fibers; polyaramids; glass fibers in the form as a woven, roving, or lofted sheet; and mixtures of the various fibers. The cloth 19 has a mesh size of 10 to 1000, that is, the mesh layer has 10 to 1000 opening per square inch. The cloth 19 tends to reduce the effects of the walls 26 on the outward appearance of the high gloss surface sheet 14.

The structural skin 16 is adhered to the second side of the open area core 12 by a second adhesive layer 22. The structural skin 16 is formed of a fiber mat, a thermoplastic sheet, or an SMC. In some embodiments the SMC is also a high gloss surface as detailed about with respect to reference numeral 14. In embodiments where the structural skin 16 is a fiber mat, the fiber mat is formed of glass fibers 13 as shown in FIG. 10. According to certain embodiments, the fiber mat forming the structural skin includes non-oriented, non-woven fibers, unidirectional, or woven fibers. The structural skin 16 is adhered to the second side of the open area core 12 by a second adhesive layer 22. The second adhesive layer 22 having the attributes of the first adhesive layer detailed above with respect to reference numeral 20. In some embodiments, the same adhesive forms both first adhesive layer 20 and second adhesive layer 22. In still other inventive embodiments, a cloth 19' is present within the second adhesive layer 22, the cloth 19' having the attributes of the cloth 19 as detailed above. In some embodiments where both cloths 19 and 19' are present, the cloths 19 and 19' are formed of the same material. In still other embodiments, the cloths 19 and 19' are formed of the same material and have the same thickness. In still other embodiments, the cloths 19 and 19' are formed of the same material, have the thickness, and are adhered by the same adhesive. In still other embodiments, the surface tension on the high gloss surface sheet 14 and the structural skin 16 are within 10% of one another.

According to embodiments, the thickness of the open area core 12, the high gloss surface sheet 14, and the structural skin may vary based on design parameters and intended use of a finished component for the inventive vehicle removable roof system 100 formed of the present disclosure. As noted above, the high gloss surface sheet 14 has a thickness of 0.5 to 3.5 mm. The ratio of the high gloss surface sheet 14 average thickness to the open area core 12 average thickness is 0.01-1:1, while the ratio of the structural skin 16 thickness to the open area core 12 thickness is 0.1-1:1. In a particular inventive embodiment, the high gloss surface sheet 14 has an average thickness of 1.5 to 5 mm and the open area core 12 has an average thickness of 6 to 25 mm. In some inventive embodiments the open area core 12 average thickness is as much as 100 mm.

According to some embodiments, a decorative layer 29 is attached to the exposed surface 31 of the structural skin 16. In some embodiments, the decorative layer 29 is a vehicle interior surface. A decorative layer 29 illustratively includes flocking, textile, carpet, leather, textured soft-touch plastic, thermoplastic film, or a combination thereof.

According to certain inventive embodiments, the composite sandwich panel assembly provides sound damping, fire retardancy, thermal insulation, or a combination thereof by placing a sound and/or heat absorbing material within the pores 24 of the open area core 12. According to embodiments, the pores 24 of the open area core 12 are at least partially filled with foam pellets, fire retardant, or a phase change material 49. Phase change materials operative herein include waxes or an inorganic salt hydrates. This feature can assist in regulating the temperature within the vehicle interior given the at the vehicle removable roof system, when installed on the vehicle, encounters extreme weather conditions such as sunlight, rain, ice, or snow.

The high gloss surface sheet 14 and the structural skin 16 are joined together along an edge 33A-33D of the composite sandwich panel assembly to form a seal, as shown in FIGS. 12A-12D, respectively. In certain inventive embodiments of the vehicle removable roof system 100, all of the edges of the composite sandwich panel assembly 10 are sealed such that the open area core 12 is fully enclosed and moisture is inhibited from entering the interior of the composite sandwich panel assembly 10. Given the intended use and location of the removable panel and other components of the inventive vehicle removable roof structure 100 formed of the composite sandwich panel assembly 10, preventing moisture from entering the interior of the composite sandwich panel assembly 10 is important given that freeze thaw cycles of moisture within the part cause expansion and potentially failure of the assembly 10. Additionally, in embodiments in which the open area core 12 is formed of a hydrophilic material such as paper, moisture within the composite sandwich panel assembly 10 would destroy the open are core 12 and cause the roof panel to fail.

FIGS. 12A-12D show various embodiments of ways in which the high gloss surface sheet 14 and the structural skin 16 are joined together to form a sealed edge 33A-33D, respectively. In some embodiments an elastomeric gasket 34 is disposed between the high gloss surface sheet 14 and the structural skin 16 at the 33C to make the edge 33C more water resistant. It is appreciated that a gasket is readily included in the other edge joinder 33A, 33B, and 33D. The gasket 34 enhances maintenance of the edge seal over a wider range of use conditions.

Figure 9:
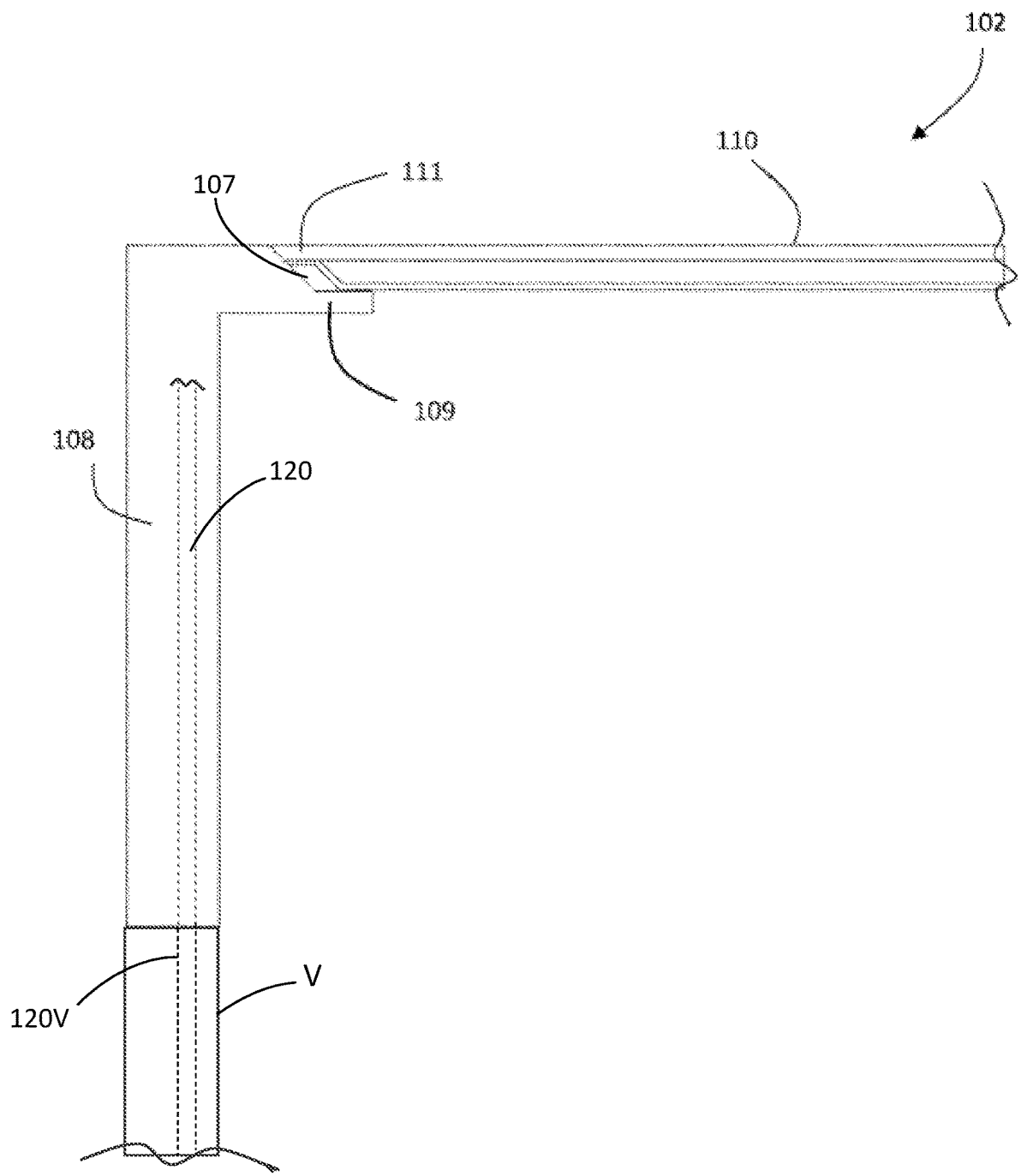
FIG. 9 is a cross sectional view of a portion of a roof support structure of a vehicle removable roof system according to embodiments of the present disclosure.

According to embodiments of the inventive vehicle removable roof system 100, the horizontally oriented roof panel 110 of the roof support structure 102 is bonded to the plurality of vertically oriented supports 108. As shown in FIG. 9, embodiments of the horizontally oriented roof panel 110 include a flange 111 that engages with a flange 109 that extends from the vertically oriented supports 108. According to embodiments, a sealing gasket 107 is positioned between flanges 109 and 111 to prevent water permeation.

According to embodiments, the roof support structure 102, in its entirety or a portion thereof, is formed of the same or similar sandwich composite panel assembly 10 material as described above with regard to the removable panel 104, i.e. an open area core defining a plurality of pores, a high gloss surface sheet adhered to a first face of said open area core by a first adhesive layer, and a structural skin adhered to a second side of said open area core by a second adhesive layer. According to inventive embodiments, horizontally oriented roof panel 110 is formed of the composite sandwich panel assembly 10 to provide the above described benefits of a light weight material having a high gloss surface finish, while the plurality of vertically oriented supports 108 are formed of materials conventionally used for removable roof structures, such as SMC, steel, aluminum, magnesium, or an alloy having a majority by weight of aluminum or magnesium.

Figure 14:
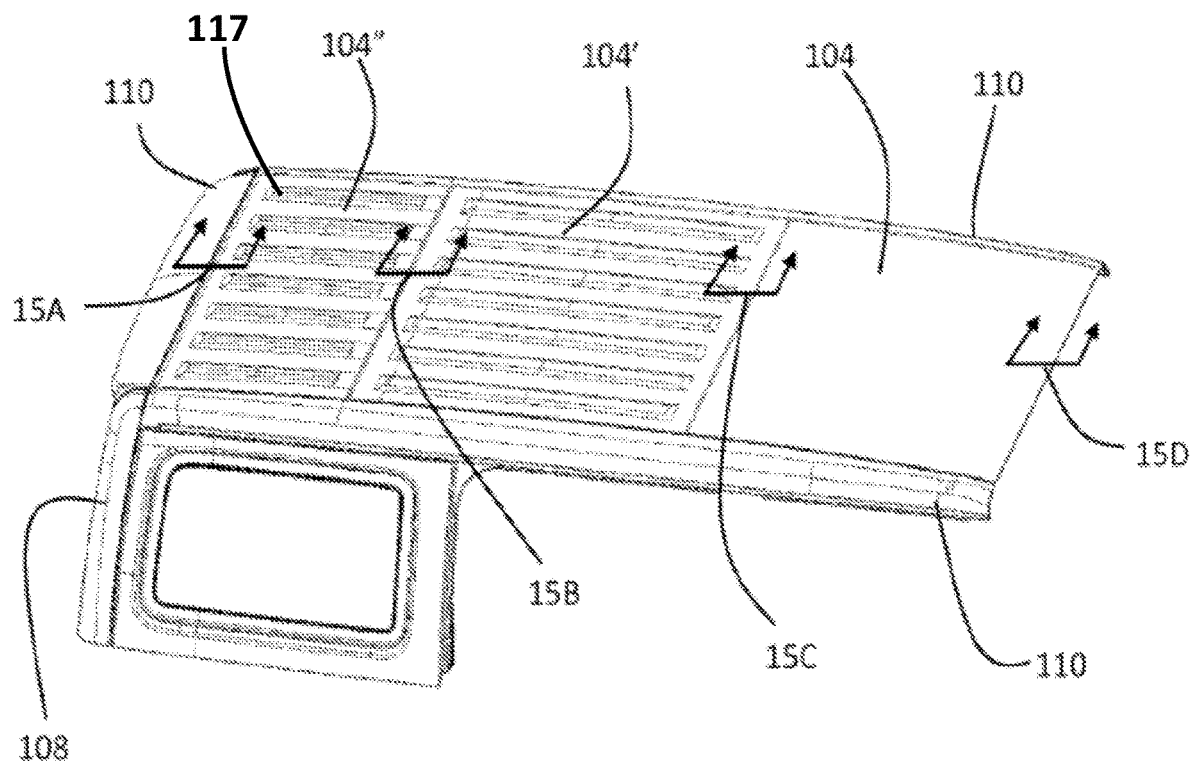
FIG. 14 is a front perspective view showing a vehicle removable roof system according to embodiments of the present disclosure.
Figure 15A:
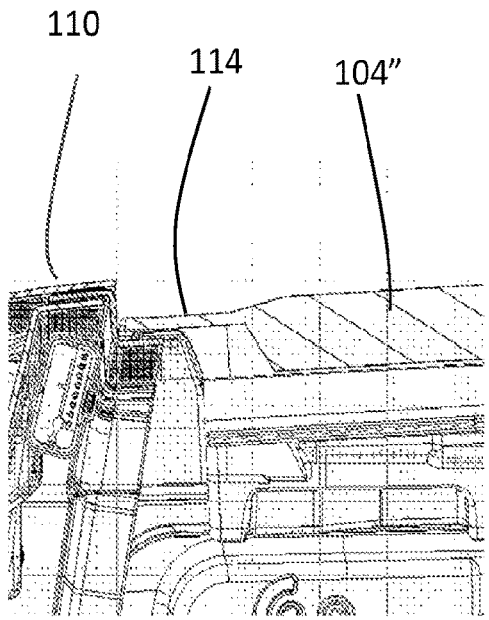
FIGS. 15A-15D are detailed cross sectional views of the vehicle removable roof system of FIG. 14.
Figure 15B:
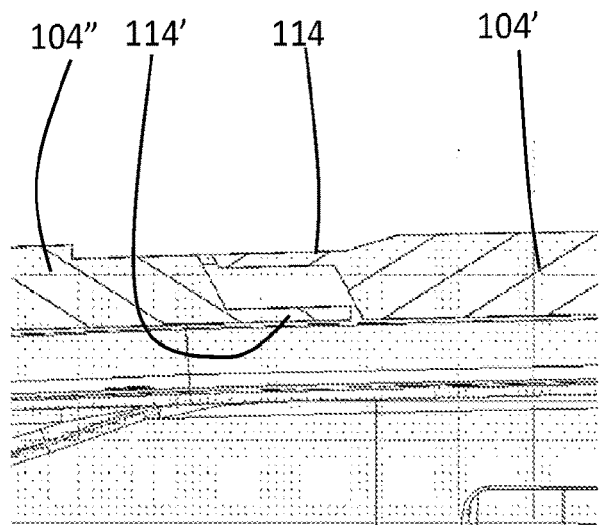
Figure 15C:
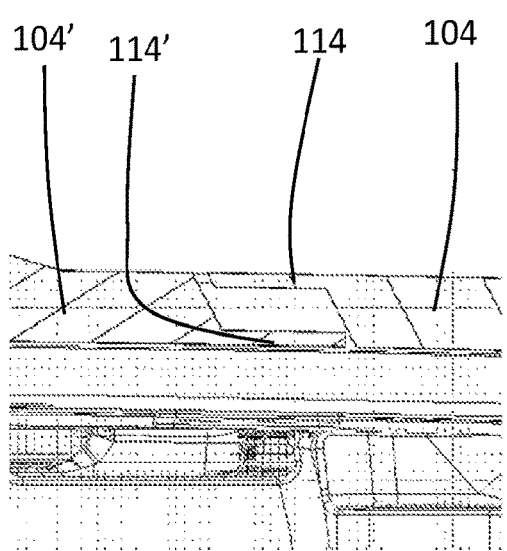
Figure 15D:
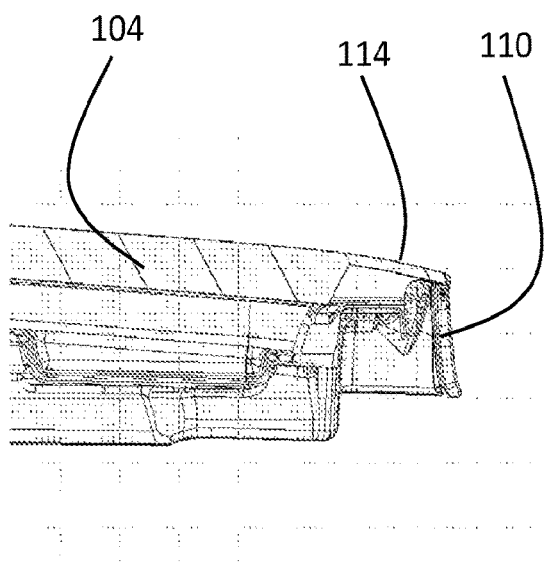
Figure 16:
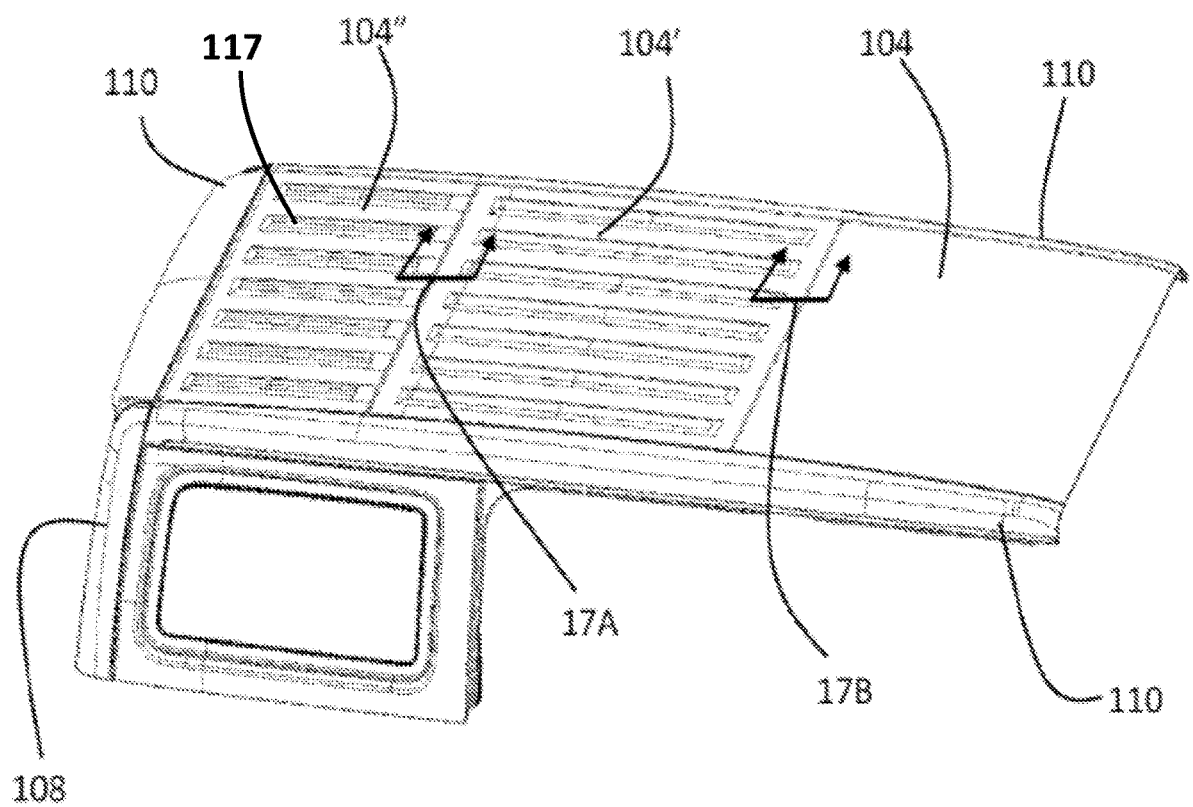
FIG. 16 is a front perspective view showing a vehicle removable roof system according to embodiments of the present disclosure.
Figure 18:
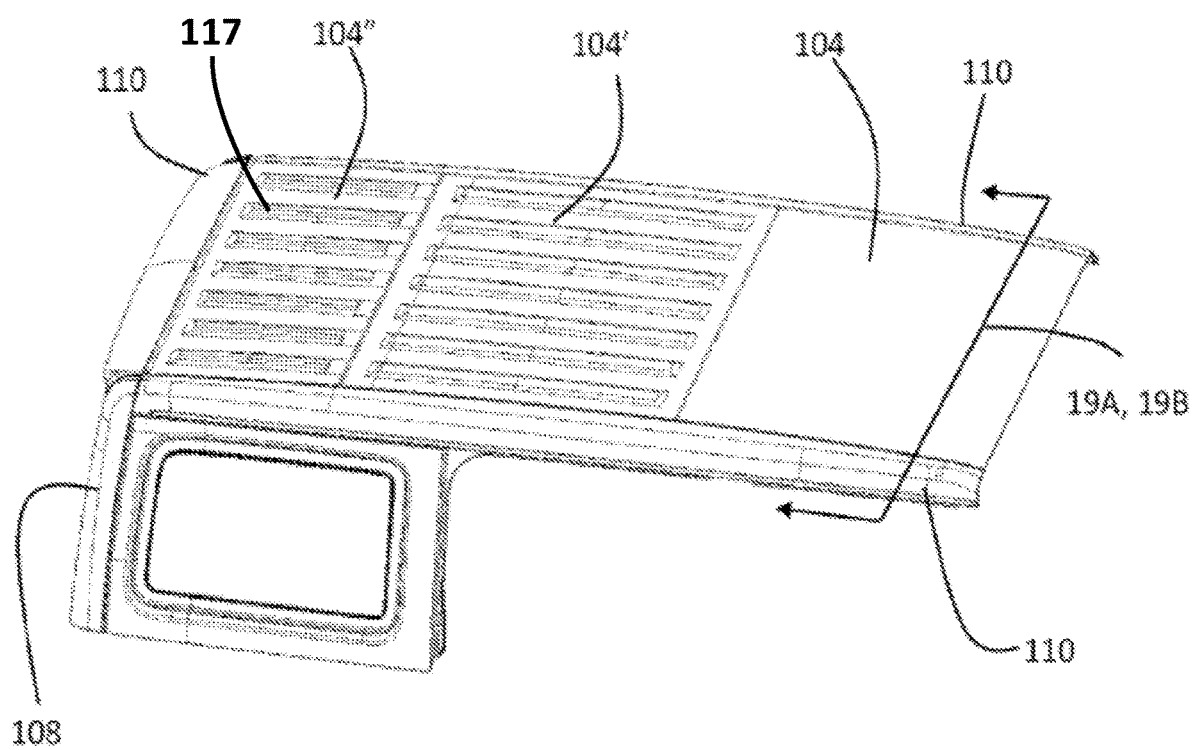
FIG. 18 is a front perspective view showing a vehicle removable roof system according to embodiments of the present disclosure.

According to embodiments, the at least one removable roof panel 104 is made up of at least two portions 104, 104', 104". Providing the removable roof panel 104, 104' in multiple portions provides increased versatility in use and further reduces the weight of each component making it easier for a user to remove and attach the roof sections. According to embodiments, each portion 104, 104' has a portion of the panel flange 114 extending therefrom that engage with the support structure flange 112 as described above, as shown in FIG. 4. Additionally, each portion 104, 104' may have a second panel flange 115, 115' extending therefrom. The second panel flange 115 of the first panel portion 104 is configured to engage the second panel flange 115' of the second panel portion 104'. According to embodiments, a second sealing gasket 116 positioned between the second panel flanges 115, 115'. According to embodiments, the at least two portions 104, 104', 104" of the at least one removable roof panel 104 include panel flanges 114, 114' that are configured to engage with one another, as shown in FIGS. 14-15D. According to further embodiments, the at least two portions of the 104, 104', 104" of the at least one removable roof panel 104 include panel flanges 114, 114' that are configured to engage with a roll bar 113 of the vehicle, as shown in FIGS. 17A and 17B. A sealing gasket may be positioned between the panel flanges and the roll bar 113. As shown in FIGS. 14, 16, and 18 the at least one removable panel (104, 104') includes structural ribs or corrugations 117.

The at least one removable roof panel 104 is configured to engage the roof support structure is a sealed yet removable fashion. According to embodiments, the at least one removable roof panel 104, 104', 104" is configured to engage with the horizontally oriented supports 110 by the interaction of at least one flange extending form the roof panel 104, 104', 104" and at least one flange extending from the at least one horizontal support, as shown in FIG. 19B. According to further embodiments, the at least one removable roof panel 104, 104', 104" is configured to engage with the horizontally oriented supports 110 by the interaction of at least one flange extending form the roof panel 104, 104', 104" and the horizontally oriented supports 110 themselves, which according to some embodiments are roll bars 113 of the vehicle, as shown in FIG. 19A.

Figure 4:
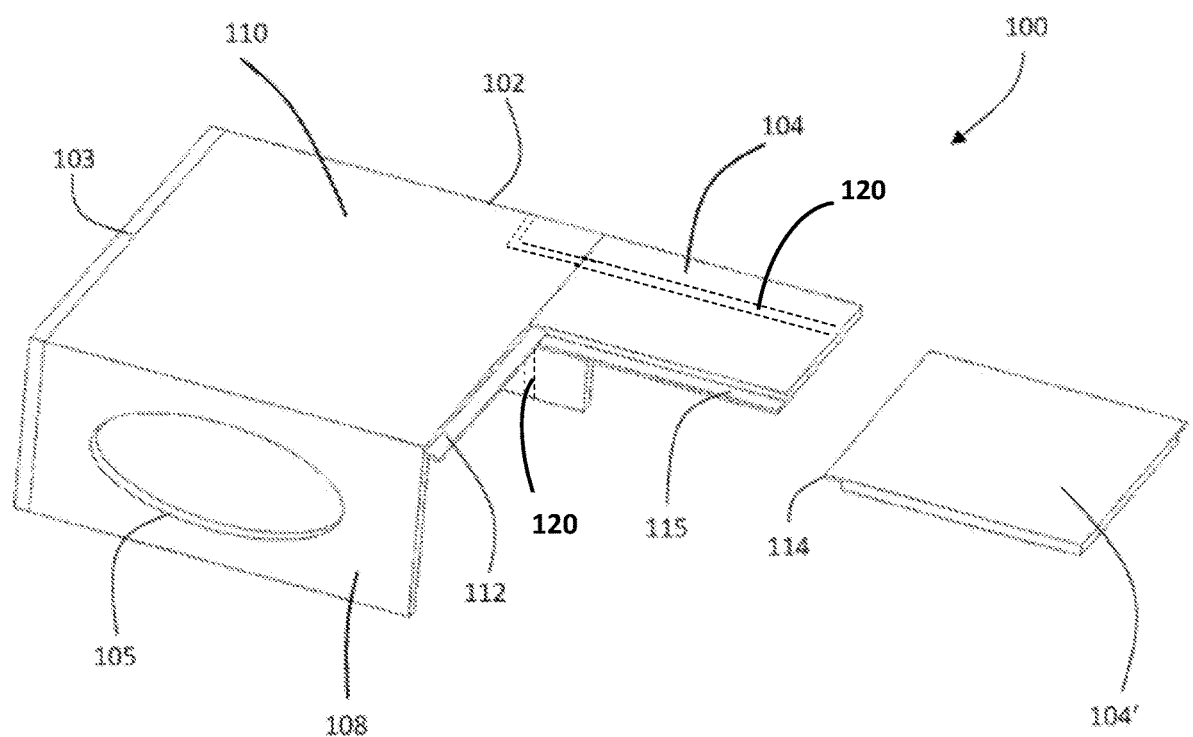
FIG. 4 is a front perspective view showing a vehicle removable roof system with a portion of a removable panel of the roof system removed.
Figure 5:
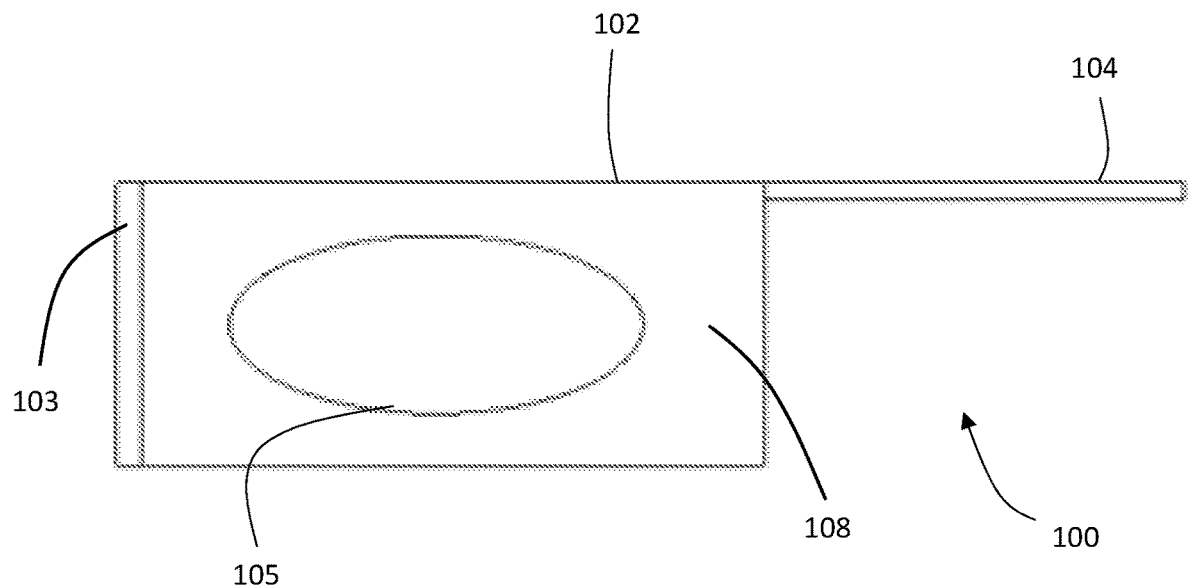
FIG. 5 is a side view showing a vehicle removable roof system according to embodiments of the present disclosure.
Figure 13:
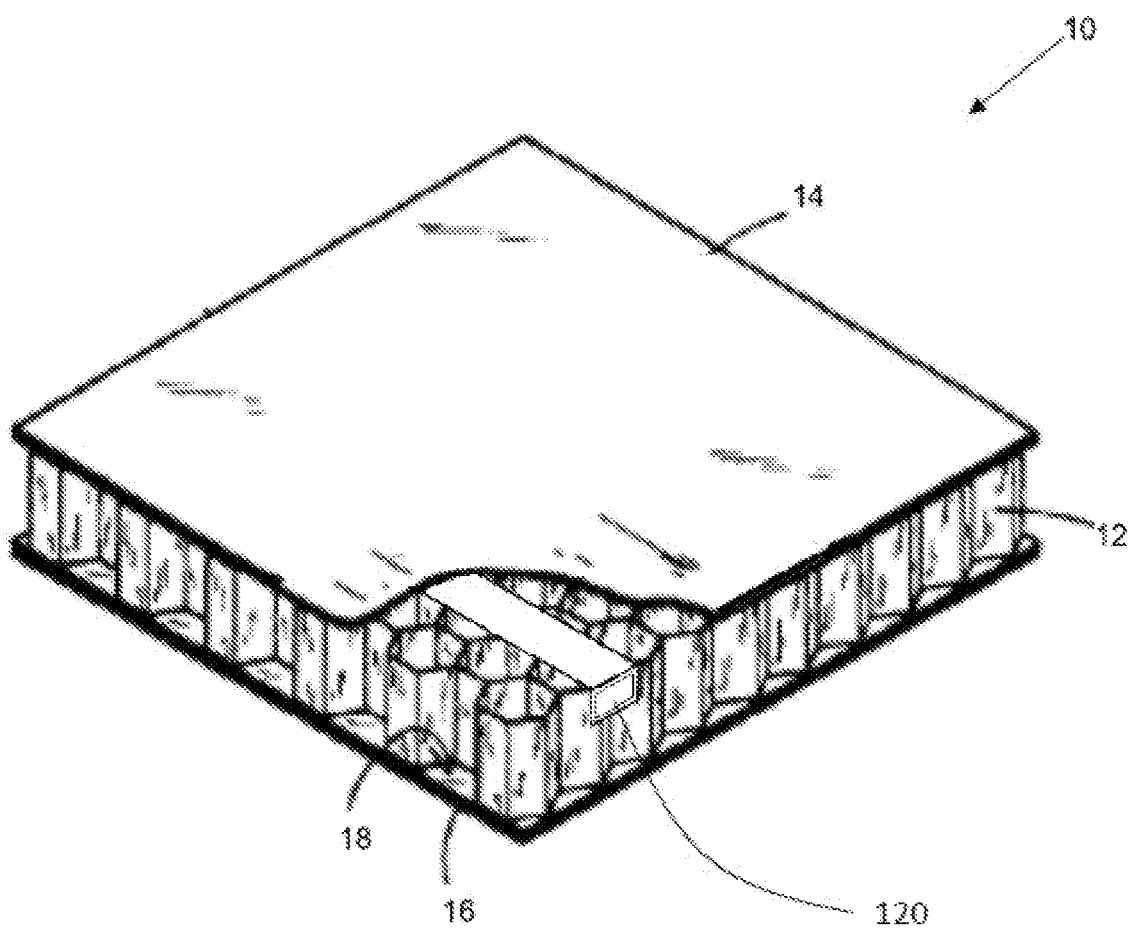
FIG. 13 is a partial cutaway, perspective view of composite sandwich assembly having a conduit system embedded therein according to embodiments of the present disclosure.

Embodiments of the inventive vehicle removable roof system further comprise a conduit system 120 embedded within at least one of the removable panel 104, 104' and the roof support structure 102 as shown in FIG. 4 as dotted line 120. As shown in FIG. 13, the conduit system 120 is embedded in the composite sandwich panel assembly 10 that forms the removable panel 104 and/or the roof support structure 102. According to embodiments, the conduit system 120 comprises tubing or wires that are molded into the open area core of the composite sandwich. According to embodiments, the conduit system 120 includes electrical wiring, ventilation ducts, or heating elements. Accordingly, the inventive vehicle removable roof system 100 is capable of including features such as speakers, lights, air vents for regulating the climate within the vehicle, and defrosting elements for removing ice or snow present on the vehicle roof. In embodiments in which both the removable panel 104 and the roof support structure 102 include portions of the conduit system 120, the portions of the conduit system 120 align such that the portions of the conduit system connect to form a single connected conduit system. According to embodiments, the conduit system 120 present in the vehicle removable roof system 100 aligns with a conduit system 120V of the vehicle V as shown in FIG. 9. That is, electrical wiring, ventilation ducts, and/or heating elements present in the removable roof system 100 connect with like electrical wiring, ventilation ducts, and/or heating elements of the vehicle V to function.

The foregoing description is illustrative of particular embodiments of the invention but is not meant to be a limitation upon the practice thereof. The following claims, including all equivalents thereof, are intended to define the scope of the invention.

The invention claimed is:

1. A vehicle removable roof system comprising:
a roof support structure removably attachable to said vehicle, said roof support structure comprising a plurality of vertically oriented supports and at least one horizontally oriented support; and
at least one removable panel, said at least one removeable panel formed of a composite sandwich panel assembly comprising:
an open area core defining a plurality of pores, a high gloss surface sheet adhered to a first face of said open area core by a first adhesive layer, and a structural skin adhered to a second side of said open area core by a second adhesive layer, said open area core being thick relative to said high gloss surface sheet and said structural skin, the at least one removable panel configured to engage with the roof support structure; and
an edge that joins said high gloss surface sheet and said structural skin to form a moisture resistant seal that fully encloses said open area core and inhibits moisture from entering an interior of said composite sandwich panel assembly, the interior occupied by said open area core.

2. The vehicle removable roof system of claim 1, wherein the open area core is formed of cellulosic material.

3. The vehicle removable roof system of claim 1, wherein the first adhesive layer contacts an interior volume of the open area core.

4. The vehicle removable roof system of claim 1, wherein said structural skin is formed of a fiber mat.

5. The vehicle removable roof system of claim 4, wherein the second adhesive layer impregnates the glass fiber mat.

6. The vehicle removable roof system of claim 1, wherein the horizontally oriented support is bonded to the plurality of vertically oriented supports.

7. The vehicle removable roof system of claim 1 wherein the roof support structure is removably attached to said vehicle.

8. The vehicle removable roof system of claim 1, wherein said at least one removable panel has a panel flange extending therefrom, the panel flange configured to engage with a support structure flange that extends from at least a portion of said roof support structure.

9. The vehicle removable roof system of claim 8 further comprising a gasket positioned between the support structure flange and the panel flange.

10. The vehicle removable roof system of claim 1, wherein said at least one removable panel comprises at least one roof panel.

11. The vehicle removable roof system of claim 10, wherein said at least one removable panel includes structural ribs or corrugations.

12. The vehicle removable roof system of claim 10, wherein the at least one roof panel comprises a plurality of roof panels configured to engage one another and said roof support structure.

13. The vehicle removable roof system of claim 12, wherein the plurality of roof panels engage one another at corresponding flanges extending therefrom.

14. The vehicle removable roof system of claim 13, further comprising a sealing gasket positioned between the corresponding flanges extending from the plurality of roof panels.

15. The vehicle removable roof system of claim 1, further comprising a conduit system embedded in the composite sandwich panel of said at least one removable panel.

16. The removable roof system of claim 15, wherein the conduit system embedded in the composite sandwich panel of said at least one removable panel aligns with a conduit system of said vehicle.

17. The vehicle removable roof system of claim 1, further comprising a conduit system embedded in at least a portion of said roof support structure.

18. The vehicle removable roof system of claim 17, wherein the conduit system embedded in said roof support structure aligns with the conduit system embedded in the composite sandwich panel of said at least one removable panel.

19. The vehicle removable roof system of claim 1, further comprising an elastomeric gasket disposed between said high gloss surface sheet and said structural skin at said edge.

20. The vehicle removable roof system of claim 1, further comprising at least one of sound dampening, fire retarding, or heat absorbing material within said pores of said open area core.

* * * * *